United States Patent

[11] 3,563,385

[72] Inventor: Sergei Ivanovich Bykov
Smolenskaya ul., 10, Kv. 156, Moscow, U.S.S.R.
[21] Appl. No. 818,596
[22] Filed Apr. 23, 1969
[45] Patented Feb. 16, 1971

[54] SAND FILTER FOR WATER PURIFICATION
6 Claims, 2 Drawing Figs.
[52] U.S. Cl. .................................................. 210/268
[51] Int. Cl. ............................................. B01d 33/16
[50] Field of Search ........................................ 210/189, 268

[56] References Cited
UNITED STATES PATENTS
733,174 7/1903 Engel .......................... 210/268
744,764 11/1903 Kathol .......................... 210/268
1,007,929 11/1911 Deacon et al. ................ 210/189X
1,130,382 3/1915 Deacon et al. ................ 210/189

Primary Examiner—Samih N. Zaharna
Attorney—Waters, Roditi, Schwartz & Nissen

ABSTRACT: A sand filter for water purification comprises external channels for feeding water to be purified to the outer of two spaced, vertical walls which are water permeable along their entire height. The sand charge is between the walls. A water collecting chamber is provided within the inner wall and it communicates with a water collecting manifold arranged in the lower part of the filter. Self-cleaning grates are installed in the path of water flow from the openings in the outer wall to the sand charge between the walls.

SAND FILTER FOR WATER PURIFICATION

This invention relates to the filters for the purification of drinking, industrial sewage water.

Known in the prior art are sand filters, in which the water to be purified is admitted into the filter through water permeable walls of the shutter type and is purified while flowing through the sand charge in the upward direction.

A disadvantage of the conventionally known filters is their low efficiency. Besides, in the course of operation of the conventionally known filters, the openings thereof are periodically clogged by sand or large size suspended particles, resulting in the filter operation. To restore the filter serviceability in this case, the equipment should be disengaged and the openings cleaned from foreign matter.

It is an object of this invention to avoid the above-mentioned disadvantages of the conventionally known filters and to provide such a filter which, through comparatively simple in design, will have a comparatively higher efficiency and be reliable in operation.

In accordance with the object mentioned above, there is provided a sand filter for water purification in which the sand charge is contained between the outside vertical water permeable walls and the walls of the water collecting chamber, wherein, according to the invention, the ducts feeding the water to ensuring uniform distribution of the water being filtered all over the filtering surface of the water filter.

It is also expedient that the perforations of said grates have the shape of widening slots arranged vertically with their apexes facing the sand charge, thus precluding the filter clogging by the sand.

Further, under the water permeable walls (around the funnel-shaped bottom) a circular manifold is preferably installed, said manifold communicating with the water collecting chamber by means of pipes, which makes the filter more compact, especially in a plan view thereof.

It is expedient to install a classifier in the upper part of the filter above the water collecting chamber, water permeable walls and sand charge, said classifier having the shape of a truncated cone with perforated walls, said perforations widening out towards the filter periphery, thus ensuring a special pattern of sand distribution in accordance with the grain size, the fine phase being located at the water collecting chamber, and the coarse phase, at the water permeable outside walls.

Owing to the arrangement, when the size of the sand grains decreases in the direction of flow of the water being filtered, the longest possible duration of the working cycle, be purified, are located outside the filter, while the chamber for collecting the filtered water is accommodated inside the filter, the walls of said filter being water permeable throughout their entire height, while a filtered water discharge manifold is located in the bottom.

By virtue of this arrangement, the water being filtered is distributed uniformly over the entire external surface of the water permeable walls, owing to which the value characterizing the ratio between the filtering surface area and the unit of filter volume approaches the optimum value of unity.

The likelihood of clogging the water permeable walls is reduced.

In the preferable embodiment of the filter according to this invention, it is expedient, that the ducts, supplying the water to be purified be arranged vertically and equispaced all over the surface of the outside walls, said water ducts having the shape of chutes, facing said walls and tightly fitting to said walls.

Owing to this design of the ducts, the useful volume of the filter is increased, (said ducts do not take any space inside the filter casing).

The outside walls should preferably have openings, closed from the inside of the filter by perforated grates, or a higher efficiency of the filter is ensured.

The advantage of the invention consists in that the efficiency of the filter increases approximately four times, as compared to the conventionally known filter types, and a relatively high speed of water filtration is ensured, despite a high content of suspended matter in the water being purified.

The specific features and advantages of this invention will appear more completely from the following description of a typical embodiment thereof which is given by way of example with reference to the accompanying drawings, in which.

Figure 1:
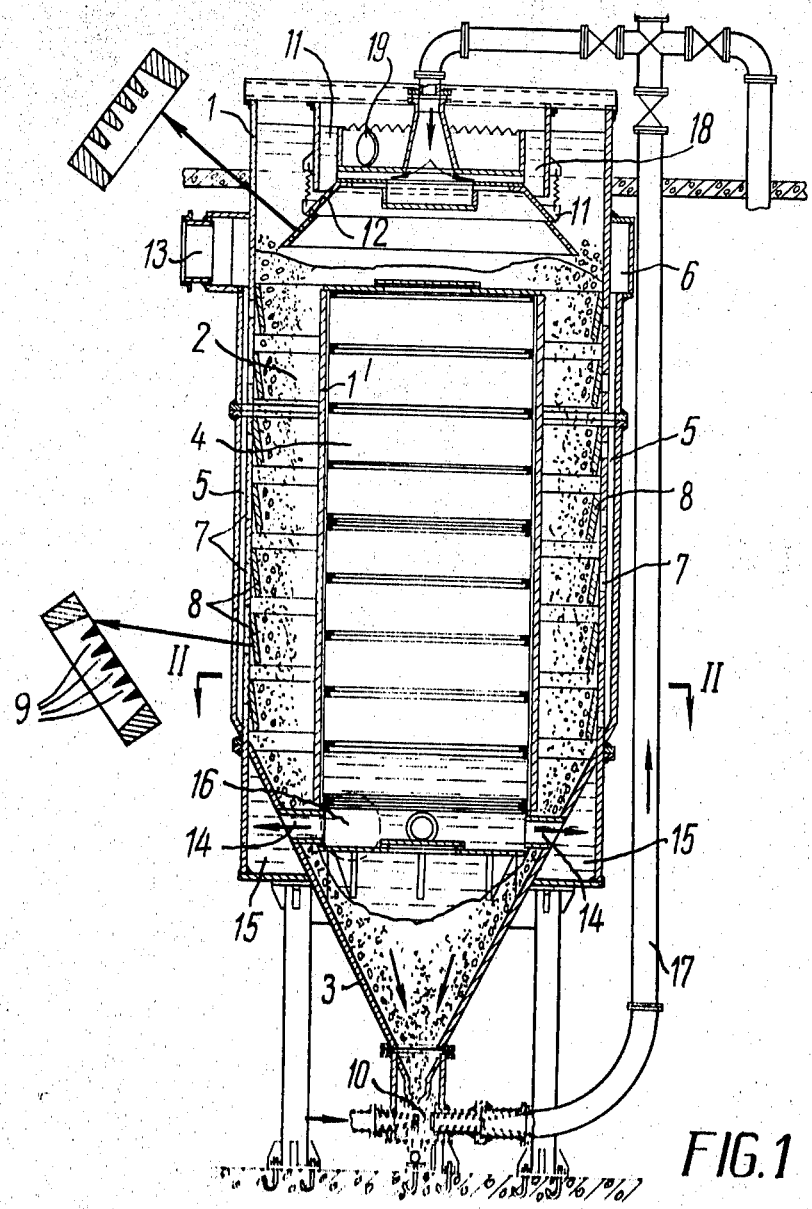
FIG. 1 is a vertical section of a sand filter for water purification in accordance with this invention.
Figure 2:
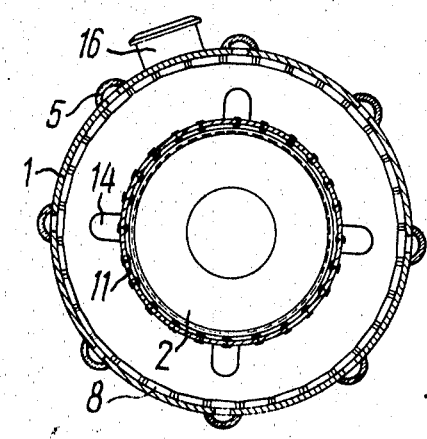
FIG. 2 is a section taken along line II—II of FIG. 1.

The sand filter for water purification has double walls 1, 1' of a cylindrical shape which are water permeable throughout their entire height.

The space between the walls 1 and 1' is filled with a sand charge 2.

A funnel-shaped bottom 3 serving as a collector for the sand charge adjoins the walls 1 and 1'.

The filter casing accommodates a water collecting chamber 4. The wall 1' forming the water collecting chamber 4 has the form of a perforated screen, said perforations having the shape of slots narrowing in the direction towards the walls 1.

Located on the external surface of the outer walls are vertical ducts 5 communicating with each other through a circular manifold 6 intended to distribute the water being filtered through said ducts.

At the places of location of the vertical ducts 5, the walls 1 have openings 7 with the grates 8 secured above said wall openings, said grates having perforations 9, narrowing in the direction towards the water collecting chamber 4.

The filter is provided with a hydraulic lift means 10 intended to transfer the contaminated sand charge from the funnel-shaped bottom 3 into a washing unit 11.

In the lower part of the washing unit 11 a classifier 12, is provided, said classifier being intended to distribute the sand in accordance with the decreasing size of its grains in the direction from the outside walls 1 towards the water collecting chamber 4, which is achieved by widening the classifier slots 12' in the direction towards the filter periphery.

The filter for water purification operates as follows.

Contaminated water is admitted into the manifold 6 through a pipe 13 wherefrom it flows through the vertical ducts 5 and openings 7 into the space under the perforated grates 8 and further through the perforations 9 into the space filled with the sand charge 2.

After being cleaned of contaminating matter, the water flows through the slots in the walls 1 into the water collecting chamber 4.

From the water collecting chamber 4 the filtered water flows through the pipes 14 into the circular manifold 15 and thence through the pipe 16 to the consumer.

The sand charge, contaminated in the course of filtration, is removed either periodically or continuously with the aid of the hydraulic lift means 10, and is transferred via the pipe 17 into the washing unit 11 where said sand charge is cleaned from the contaminating matter and is admitted through the circular space 18 into the classifier 12. The classifier 12 distributes the sand charge in accordance with the decreasing size of the grains in the direction from the outer walls 1 towards the water collecting chamber 4.

The contaminated washing water from the washing unit 11 is drained from the filter through the pipe 19.

We claim:

1. A sand filter for water purification, said filter comprising first and second spaced vertical walls with a sand charge therebetween, said walls having openings for being water permeable throughout their height, duct means on said first wall on the side thereof remote from the sand charge for supplying water to said first wall for passage through the openings therein to the sand charge, grates adjoining the openings in the first wall and having slots spaced vertically and tapering in narrowing direction towards said sand charge for the passage of water to the sand charge, a collecting chamber for filtered water on the side of the second wall remote from said sand charge, and a water collecting manifold at the bottom of said collecting chamber.

2. A filter as claimed in claim 1 wherein said duct means comprises vertical ducts in the form of chutes tightly fitted on the first wall and in communication with the openings therein.

3. A filter as claimed in claim 1 wherein said grates are inclined upwardly towards said first wall.

4. A filter as claimed in claim 1 wherein said walls are annular.

5. A filter as claimed in claim 4 comprising a funnel-shaped bottom portion with solid walls adjoining the first and second walls for collecting the sand charge, said bottom portion having a lower opening for discharge of sand charge.

6. A filter as claimed in claim 5 wherein said manifold is annular and surrounds said funnel-shaped bottom portions, and means communicating said manifold with said collecting chamber, said manifold having an outer wall aligned with said first wall.